Aug. 12, 1952 E. HORANSKÝ 2,606,582
DEVICE FOR THE SHAPING OF SHOE HEELS AND THE LIKE
Filed March 14, 1949
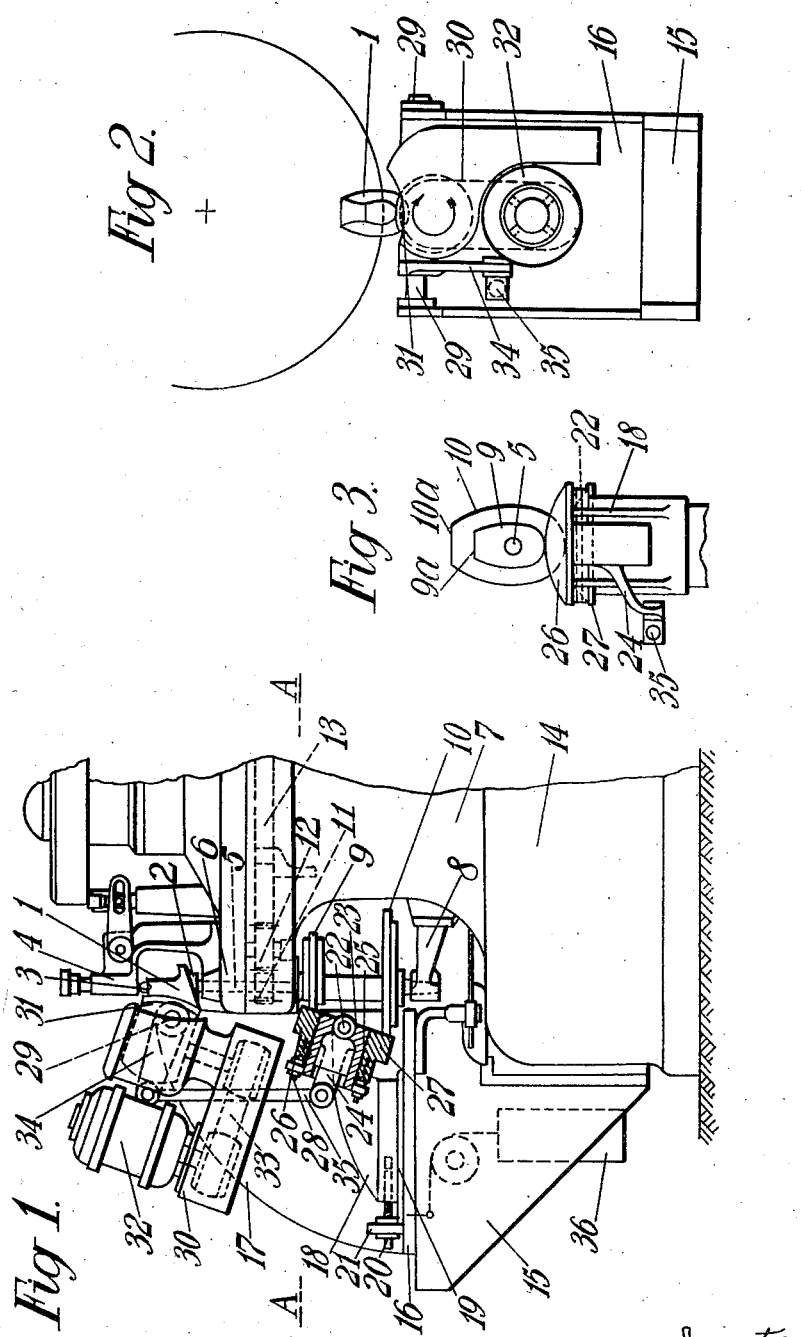
Inventor
Eduard Horansky,
By: Pierce, Scheffler & Parker,
Attorneys.

Patented Aug. 12, 1952

2,606,582

UNITED STATES PATENT OFFICE 2,606,582

DEVICE FOR THE SHAPING OF SHOE HEELS AND THE LIKE

Eduard Hořanský, Gottwaldov, Czechoslovakia, assignor to Svit, národní podnik, Gottwaldov, Czechoslovakia Application March 14, 1949, Serial No. 81,342
In Czechoslovakia March 16, 1948

5 Claims. (Cl. 144—142)

1

This invention relates to a device for machining the periphery of shaped pieces, such as for example, shoe heels of wood or like material.

A great variety of machines are known for machining the periphery of shoe heels, the manipulation of which is effected either partly by hand or entirely automatically. In the case of machines partly controlled by hand, it is usual to machine, viz. cut, the whole of the periphery with a single cutter, that is to say, to start the cutting at one edge of the heel front and finish it at the other edge, whilst in the case of automatic and more particularly American machines, the cutting is effected by means of two cutters in two phases, in such a manner that one cutter cuts one half of the periphery of the shoe heel by beginning at one front edge and finishing in the second half of the periphery, whilst the second cutter cuts the second part of the periphery in the same manner. All these known machines have a feature in common, namely that the machining tool or tools, that is to say the cutters, are so arranged that they effect only their rotary movement, whilst all the other work movements are effected by the work-piece, that is to say, the shoe heel. The constructive difficulties connected with the arrangement of the drive of the working movements of the working-piece while the machining tool is stationary have hitherto been the reason that in the manufacture of shoe heels no automatic machine has hitherto been available for machining the periphery of shoe heels which would work in a single operation, that is to say, with a single cutter.

If the tool effects solely its rotary movement, the work-piece must carry out on the one hand a rotary movement and on the other hand a combined movement in the cut against the tool, which movement is derived from cam discs arranged in different ways. In most cases these cam discs are arranged on independent shafts, the drive of which takes place synchronously with the rotary movement of the work-piece.

In the case of automatic machines for the manufacture of shoe heels several operations are usually combined on the periphery of the shoe heels, such as rough cutting, fine cutting and cleaning, which operations take place at different working stations, at one of which the shoe heel is clamped in the machine and removed therefrom. The working stations are arranged on a circular turn-table which moves the individual stations from one working point to another. More particularly in the case of this kind of machine, it is very difficult from a constructive point of view to release the drive of the movement of the work-piece in the cut by retaining the hitherto usual construction so that the tool shall effect only its rotary movement.

The object of the present invention is to provide a release of such an arrangement of drive of the working movements of the tool and of the work-piece, which arrangement not only permits of the whole of the periphery of the heel being cut in one single operation by means of a single cutter, but at the same time enables this release to be used in the construction of an automatic machine for the manufacture of shoe heels which machine effects several successive operations at the periphery of the heels with one single clamping of the heel.

The invention essentially consists in this that the work-piece carries out solely a rotary movement, whilst the movements in the cut are effected by the tool in addition to the usual rotary movements. For this purpose the tool, together with its drive, is arranged on the console of a support displaceable relatively to the work-piece, which displacement of the support is controlled by means of cams. These cams are arranged directly on the shaft moving the work-piece. In addition to the direct displacement relatively to the work-piece the tool has imparted to it also rotary movement with respect to the axis of rotation of the shoe heel, this movement being derived from the cams by means of a lever transmission.

The arrangement according to the invention is very simple as compared with known devices, it enables easy regulation as regards the amount of forward feed of the tool in the cut without changing the cams, and it constitutes per se an advantageous working unit for an automatic machine for the manufacture of shoe heels, in which a number of operations are combined together as pointed out above.

Further features and advantages of the invention are referred to hereinafter with reference to the accompanying drawings in which:

Figure 1 shows the device according to the invention in elevation,

Figure 2 is a plan view thereof, and

Figure 3 is a plan view of the cams and copying member, as seen from the position A—A in Figure 1.

One form of construction of the device for the machining of the periphery of shaped pieces according to the invention is hereinafter described by way of example in connection with a working station of an automatic machine for the manufacture of shoe heels, in which a number of operations are combined together.

The work-piece, in this case a shoe heel 1, is clamped in between a jaw 2 and a pin 3 of a clamping device 4 of any known kind. The pin 3 is freely rotatable in the clamping device 4, whilst the jaw 2 is firmly connected to the shaft 5, which is mounted in the casing 6 of the table 7, through which it passes, and in a holder 8 of this table. On its lower side the shaft 5 carries two cam discs 9 and 10, and inside the casing 6 it has a toothed wheel 11 keyed to it. By means of this toothed wheel the shaft 5, together with the work-piece and the cam discs 9 and 10, receives a rotary movement from the intermediate wheel 12 and the main driving toothed wheel 13, the latter being driven by an electric motor, which is not shown.

The table 7 is rotatably mounted in the fixed frame of the machine 14, which frame carries a fixed bed 15 for a displaceable support 16. The latter supports two consoles of which the console 17 carries the cutting device whilst the console 18 carries the copying device. The console 18 is displaceably mounted in a guide 19 of the support 16 and its position can be adjusted by means of a screw 20 provided in a projection 21 of the support 16. The console 18 is further provided with a journal 22 on which the copying device 23 is rockingly mounted by means of a lever 24. The upper and lower part of the device 23 is provided with guiding grooves 25 in which copying fingers 26 and 27 are guided, their position in the copying device being adjusted by means of screws 28.

The console 17 is provided with a journal 29 on which a casing 30 is so mounted as to be capable of freely rocking thereon. The casing 30 accommodates the cutter 31 and the electric motor 32, which drives the cutter by means of a belt 33 passing over pulleys mounted in the casing. The casing is under the control of a lever 34 which is connected with the lever 24 by means of a connecting rod 35.

The support 16 is drawn constantly to the right, in Figure 1, that is to say in the direction of the cam discs 9 and 10, by the pull of a weight 36, so that the copying fingers 26 and 27 rest constantly on these discs.

The operation of the device hereinbefore described is as follows:

Before the beginning of the cutting the shaft 5 with the shoe heel 1 and the cam discs 9 and 10 lie in a position displaced through an angle of 180° with respect to the position shown in Figure 3, that is to say, the copying fingers 26 and 27 are in contact with the flat parts 9a and 10a of these discs (Figure 3). These flat parts 9a and 10a are at a slightly greater distance from the rotary axis of the shaft 5 than the largest radius of the bent peripheries of the cams 9 and 10, so that the cutter 31 lies slightly away from the heel, which in this position faces the cutter with its front side.

As soon as the shaft 5 begins to rotate, the copying fingers 26 and 27 of the copying device 23 follow the paths of the cam discs 9 and 10, and by means of the lever 24, connecting rod 35 and lever 34, the rotation around the journal 22 is transmitted to the tool casing 30 which turns around the journal 29, and at the same time the whole of the support 16 is displaced on the bed 15 as allowed by the cam discs 9 and 10. Under the action of the cam discs 9 and 10 the cutter 31 begins to machine the periphery of the shoe heel at one edge of the front and completes the work at the other edge of the heel front. After the termination of a complete revolution of the shaft 5 the flat parts 9a and 10a again push the cutter away from the work-piece.

A change in the dimensions of the cut heels with the same shape of periphery is attained by this that the position of the support 16 on the bed 15 is adjusted by means of the screw 20. A change in the profile of the periphery of the upper part of the heel with respect to the lower part or vice versa can be effected by the displacement of the copying fingers 26 and 27 in the copying device by means of adjusting screws 28.

It will be seen from the above description that the device for machining the periphery of shoe heels can operate not only as an automatic machine for effecting a single operation, but also as a working unit of an automatic machine which carries out a number of operations on the periphery of a shoe heel. In such a machine the clamped work-piece is moved from one working station to another together with the shaft 5 and the turn-table 7. In view of the fact that the work-piece itself carries out merely a rotary movement, the release of the drive of this further movement for each station causes no difficulties, the machine is very simple and is substantially of smaller dimensions as compared with the usual machines.

I claim:

1. A device for the automatic machining of the periphery of shaped pieces, such as shoe heels of wood and like material comprising in combination with the tool and a driving motor therefor, a casing on which the tool and its driving motor are mounted, a console having a journal on which the casing is rotatably mounted, a copying device, a second console carrying the copying device, a support on which the said two consoles are mounted and which is displaceably mounted in the bed of the machine, a shaft for rotating the work-piece, cam means secured on said shaft, means yieldingly biasing the support constantly in the direction towards the work piece until the copying device abuts against the said cam means and connecting means between the copying device and the casing on which the tool is mounted for moving the cutter in coordination with motion of the copying device.

2. A device for the automatic machining of the periphery of shaped pieces, such as shoe heels of wood and like material comprising in combination with the tool and a driving motor therefor, a casing on which the tool and its driving motor are mounted, a console having a journal on which the casing is rotatably mounted, a copying device, a second console carrying the copying device, a support on which the said two consoles are mounted and which is displaceably mounted in the bed of the machine, a shaft for rotating the work-piece, two cam discs secured to the said shaft, a weight arranged to pull the support constantly in the direction towards the work-piece until the copying device abuts against the said cam discs and connecting means between the copying device and the casing on which the tool is mounted for moving the cutter in coordination with motion of the copying device.

3. A device as claimed in claim 2, in which the connecting means comprises a lever system interposed between the copying device and the casing on which the tool is mounted for transmitting the action of the cam discs to the tool during the rotation of the shaft which carries the cam discs and rotates the work-piece.

4. A device as claimed in claim 2, in which the console carrying the copying device is displaceably mounted in the said support and including an adjusting screw for effecting the said displacement, whereby the amount of displacement of the tool into the cut is varied.

5. A device as claimed in claim 2, in which the copying device has displaceable copying fingers and adjusting screws for displacing the said fingers for the purpose of changing the profile of the periphery of the work-piece.

HOŘANSKÝ, EDUARD.

REFERENCES CITED

The following references are of record in the file of this patent:

UNITED STATES PATENTS

| Number | Name | Date |
|---|---|---|
| 1,284,847 | Winkley | Nov. 12, 1918 |
| 2,076,123 | Gialdini | Apr. 6, 1937 |

FOREIGN PATENTS

| Number | Country | Date |
|---|---|---|
| 563,634 | France | Sept. 29, 1923 |